United States Patent
Hamano

(10) Patent No.: US 11,961,307 B2
(45) Date of Patent: Apr. 16, 2024

(54) OUTSIDE ENVIRONMENT RECOGNITION DEVICE

(71) Applicant: Mazda Motor Corporation, Hiroshima (JP)

(72) Inventor: Daisuke Hamano, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 49 days.

(21) Appl. No.: 17/618,517

(22) PCT Filed: Mar. 13, 2020

(86) PCT No.: PCT/JP2020/011261
§ 371 (c)(1),
(2) Date: Dec. 13, 2021

(87) PCT Pub. No.: WO2020/250520
PCT Pub. Date: Dec. 17, 2020

(65) Prior Publication Data
US 2022/0237920 A1    Jul. 28, 2022

(30) Foreign Application Priority Data
Jun. 14, 2019   (JP) ................................ 2019-111369

(51) Int. Cl.
*G06V 20/56*        (2022.01)
*G08G 1/16*         (2006.01)
(Continued)

(52) U.S. Cl.
CPC ............. *G06V 20/56* (2022.01); *G08G 1/166* (2013.01); *H04N 23/61* (2023.01); *H04N 23/80* (2023.01); *H04N 23/90* (2023.01)

(58) Field of Classification Search
CPC ........ G06V 20/56; G06V 10/25; G06V 20/58; H04N 5/04; H04N 21/242; H04N 21/4305; H04N 7/56; H04N 13/398
See application file for complete search history.

(56) References Cited

U.S. PATENT DOCUMENTS 9,516,297 B2 * 12/2016 Delacoux ............... H04N 5/073
11,546,570 B2 * 1/2023 Taketani .................. H04N 5/04
(Continued)

FOREIGN PATENT DOCUMENTS

| | | |
|---|---|---|
| JP | 2005-117554 A | 4/2005 |
| JP | 2008-211373 A | 9/2008 |
| JP | 2012-138671 A | 7/2012 |

OTHER PUBLICATIONS

International Search Report and Written Opinion dated Jun. 2, 2020, received for PCT Application PCT/JP2020/011261, Filed on Mar. 13, 2020, 8 pages including English Translation.

*Primary Examiner* — Boubacar Abdou Tchoussou
(74) *Attorney, Agent, or Firm* — XSENSUS LLP

(57) ABSTRACT

An external environment recognition device includes: a plurality of external environment recognition sensors each having an information detection unit that detects information of an object outside a vehicle, the plurality of external environment recognition sensors being arranged such that a detection range of the information detection unit includes an overlapping region where at least part of the detection range of the information detection unit overlaps with at least part of the detection range of another one of the information detection units; and a synchronous processing unit that extracts identical objects in the overlapping region from detection results of the external environment recognition sensors, and performs synchronous processing to synchronize the plurality of external environment recognition sen- (Continued)

sors if there is a deviation in position between the identical objects in the overlapping region.

9 Claims, 8 Drawing Sheets

(51) Int. Cl.
*H04N 23/61* (2023.01)
*H04N 23/80* (2023.01)
*H04N 23/90* (2023.01)

(56) References Cited

U.S. PATENT DOCUMENTS

| | | | |
|---|---|---|---|
| 2005/0078185 A1 | 4/2005 | Suzuki et al. | |
| 2010/0060735 A1 | 3/2010 | Sato | |
| 2013/0010084 A1* | 1/2013 | Hatano | H04N 13/246 |
| | | | 348/47 |
| 2018/0160042 A1* | 6/2018 | He | H04N 13/156 |
| 2019/0289282 A1* | 9/2019 | Briggs | G06T 7/593 |
| 2020/0267372 A1* | 8/2020 | Taketani | H04N 23/61 |

* cited by examiner

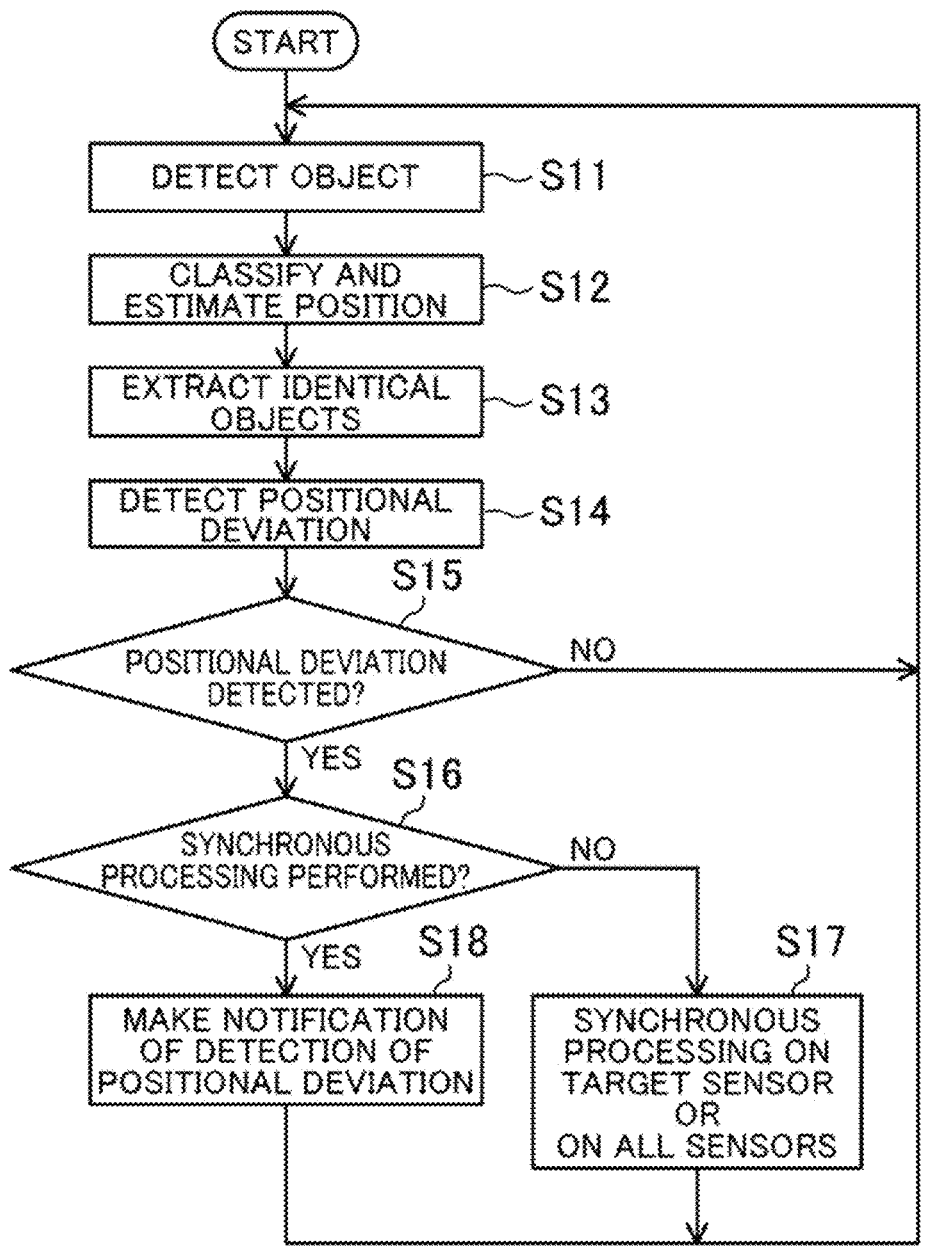

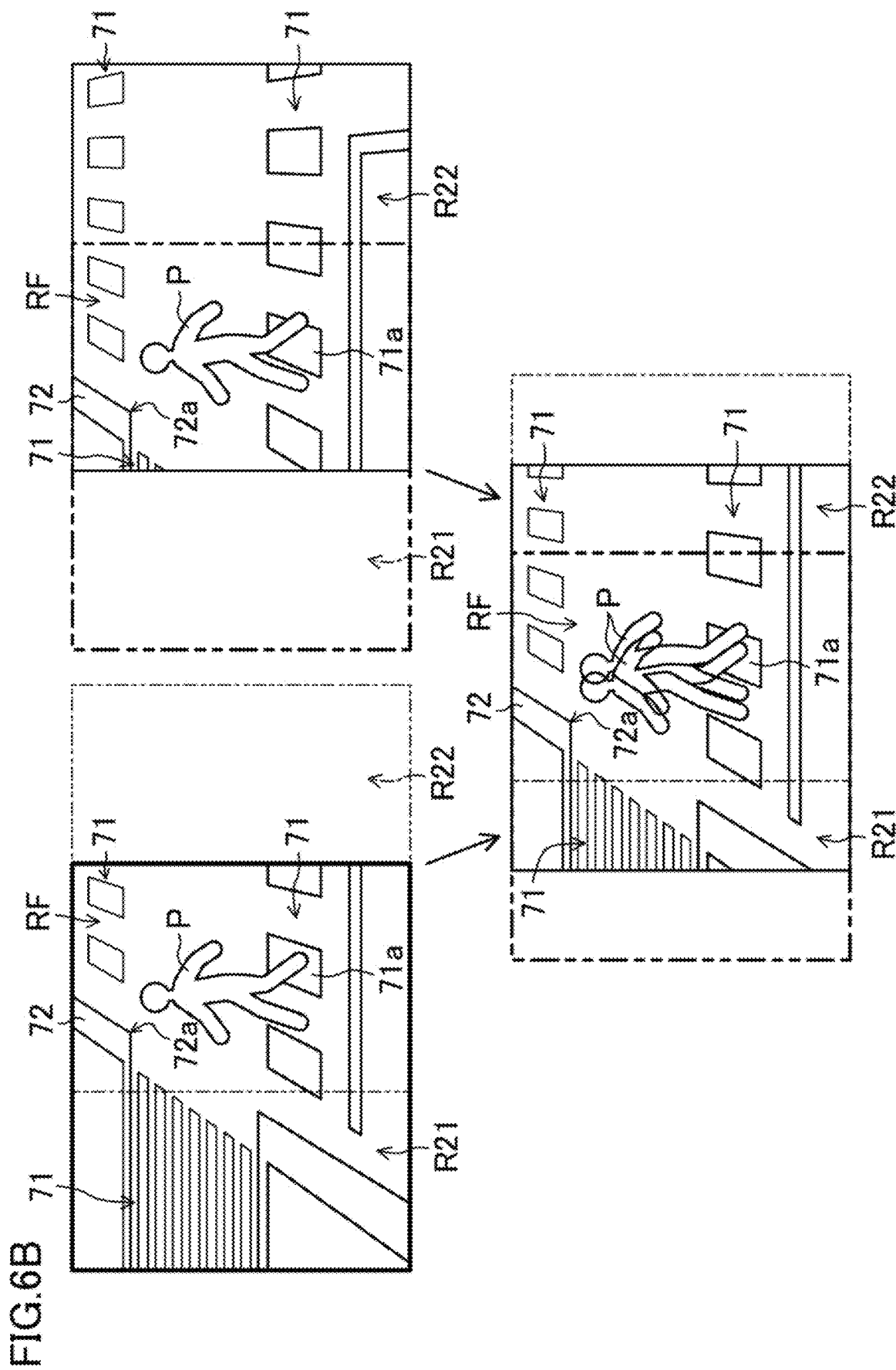

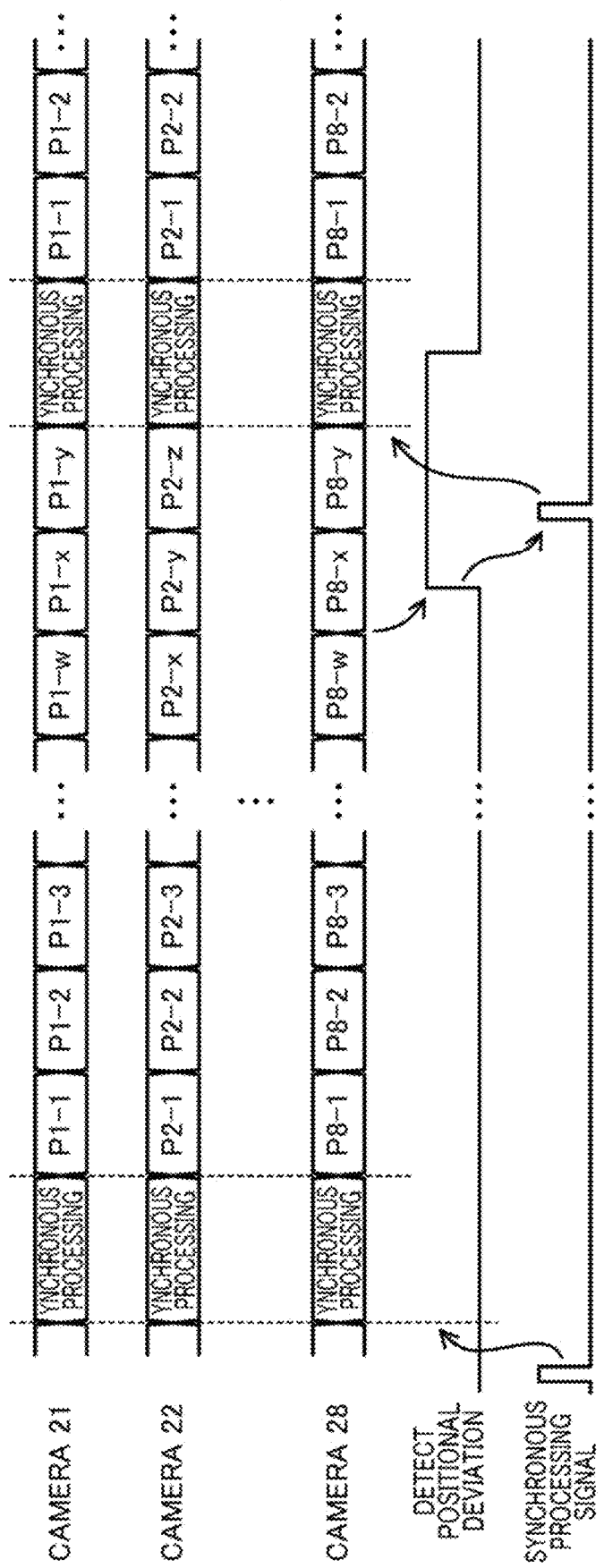

OUTSIDE ENVIRONMENT RECOGNITION DEVICE

CROSS-REFERENCE TO RELATED APPLICATIONS

The present application is based on PCT filing PCT/JP2020/011261, filed Mar. 13, 2020, which claims priority to JP 2019-111369, filed Jun. 14, 2019, the entire contents of each are incorporated herein by reference.

TECHNICAL FIELD

The technology disclosed herein belongs to a technical field of an external environment recognition device for use in an autonomous mobile object.

BACKGROUND ART

Autonomous mobile objects that move, travel, fly, etc. (simply hereinafter "move" may be used as a collective term) while recognizing the external environment use a sensing device, such as a plurality of cameras, to recognize the external environment, and determine a moving direction, a moving speed, etc., based on the recognition result. In the field of autonomous mobile objects, the following technologies have been known to recognize the external environment correctly: a plurality of cameras are mounted on an autonomous mobile object, in which synchronous processing is performed on the cameras, or image processing is performed on the images captured by the plurality of cameras to align timings.

For example, Patent Document 1 discloses a technique in which cameras output image signals to an image processor, using a synchronizing signal periodically output from the image processor as a trigger.

Patent Document 2 discloses a monitoring device that monitors the surroundings of a vehicle based on images captured by two imagers having imaging regions that overlap each other. To avoid using images captured at different timings in recognizing the external environment from the images captured by the two imagers, the monitoring device of Patent Document 2 includes an information generator that generates predetermined information for which the shift in the imaging timing has been corrected.

CITATION LIST

Patent Document

Patent Document 1: Japanese Unexamined Patent Publication No. 2005-117554
Patent Document 2: Japanese Unexamined Patent Publication No. 2008-211373

SUMMARY OF THE INVENTION

Technical Problem

However, according to the method as disclosed in Patent Document 1, the synchronous processing is performed by the cameras every time the synchronizing signal is periodically output from the image processor. Hence, the synchronous processing may be performed even when the synchronization is not necessary, which is waste of processing resources.

The monitoring device of Patent Document 2 requires correction processing by the image processing device, which may increase a processing load on the arithmetic unit or require complicated processing. The processing may become complicated or the processing load may be increased particularly when the amount of information to be dealt is increased by, for example, installing more cameras and increasing a frame rate to improve the accuracy in recognizing the external environment.

It is therefore an object of the technology disclosed herein to save processing resources for synchronous processing of an external environment recognition sensor that recognizes an external environment.

Solution to the Problem

To achieve the above object, an aspect of the technology disclosed herein is directed to an external environment recognition device that recognizes an external environment of an autonomous mobile object. The external environment recognition device includes: a plurality of external environment recognition sensors each having an information detection unit that detects information of an object outside the autonomous mobile object, the plurality of external environment recognition sensors being arranged such that a detection range of the information detection unit includes an overlapping region where at least part of the detection range of the information detection unit overlaps with at least part of the detection range of another one of the information detection units; and a synchronous processing unit that extracts identical objects in the overlapping region from results of detection made by the external environment recognition sensors, and performs synchronous processing to synchronize the plurality of external environment recognition sensors if there is a deviation in position between the identical objects in the overlapping region.

According to this configuration, synchronous processing for the plurality of external environment recognition sensors is performed if there is a deviation in position between the identical objects in the overlapping region. This configuration makes it possible to execute the synchronous processing when the positional deviation occurs. It is also possible not to execute the synchronous processing if there is no positional deviation. Thus, the processing resources for the synchronous processing can be saved, compared with the case like Patent Document 1 in which the synchronous processing is performed periodically. It is also possible to achieve synchronization at the stage of signal output from the external environment recognition sensors, that is, it is possible to synchronize signals at stages before various types of image processing or any other processing for recognizing an object outside the autonomous mobile object. The load on processing, such as image processing, can thus be reduced.

The external environment recognition device may have a configuration in which the plurality of external environment recognition sensors include a plurality of cameras arranged so as to have the overlapping region, and the synchronous processing unit extracts identical objects from images in the overlapping region of the plurality of cameras, identifies static objects from among the identical objects, and superimposes the static objects on each other to determine whether or not there is a deviation in position between the identical objects.

According to this configuration, the static objects are superimposed on each other, and it is therefore possible to improve the accuracy in detecting the positional deviation.

The external environment recognition device may have a configuration in which the synchronous processing unit performs the synchronous processing when a moving speed of the autonomous mobile object is lower than a predetermined threshold value.

According to this configuration, it is possible to perform the synchronous processing based on the information detected in a situation that is not easily affected by vibration or the like caused by the movement of the autonomous mobile object. It is therefore possible to improve stability and accuracy of the synchronous processing.

The external environment recognition device may further include an abnormality notification device that provides notification of abnormality of any one of the external environment recognition sensors if the positional deviation between the identical objects is not eliminated after the synchronous processing unit executes the synchronous processing.

This configuration makes it possible to detect that the external environment recognition sensor is physically displaced, like a shift in the installation position of the external environment recognition sensor, and notify the users or the like of such a shift in position.

Advantages of the Invention

As can be seen from the foregoing description, the technology disclosed herein makes it possible to perform synchronous processing when a positional deviation occurs. It is therefore possible to perform the synchronous processing at a relatively early stage and save resources for the synchronous processing.

BRIEF DESCRIPTION OF THE DRAWINGS

FIG. 5 is a flowchart showing an example operation of the external environment recognition device.

FIG. 6B illustrates operations of the external environment recognition device.

FIG. 7 is a timing chart showing an example operation of the external environment recognition device.

DESCRIPTION OF EMBODIMENT

An exemplary embodiment will now be described in detail with reference to the drawings. In the following embodiment, a motor vehicle having autonomous driving functions will be described as an example of the autonomous mobile object. The external environment recognition device of the present disclosure is applicable not only to a motor vehicle, but also to autonomous mobile objects, such as autonomous mobile robots, vacuum cleaners, and drones.

Figure 1:
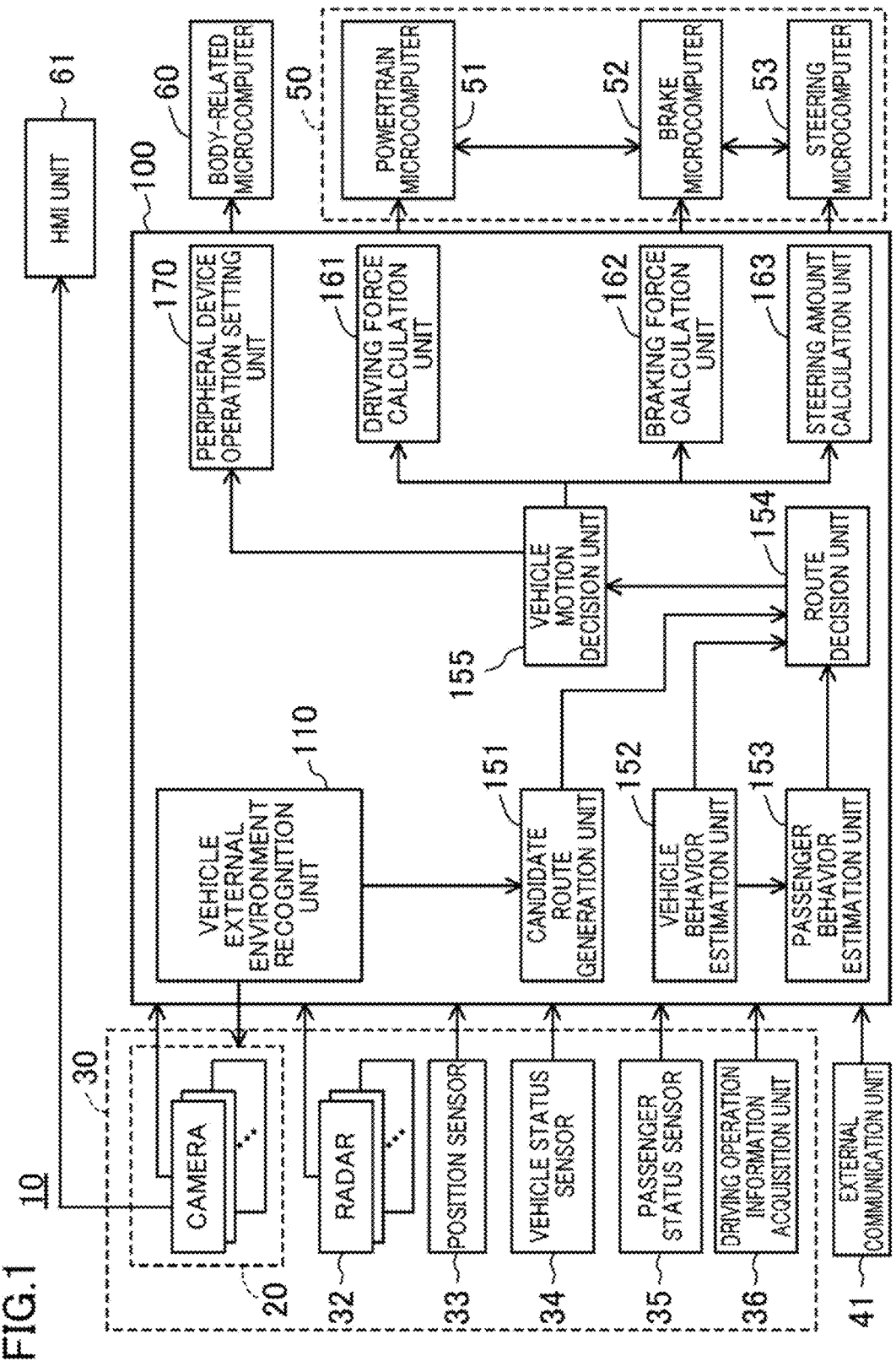
FIG. 1 is a block diagram showing a control system of a motor vehicle having an external environment recognition device on board.

FIG. 1 is a block diagram schematically showing a configuration of a control system of a vehicle 10 of the present embodiment. The vehicle 10 is configured to be capable of assisted driving and autonomous driving.

To achieve the assisted driving and autonomous driving, the vehicle 10 of the present embodiment includes an arithmetic unit 100 that calculates a route to be traveled by the vehicle 10 and determines motions of the vehicle 10 so that the vehicle 10 follows the route, based on outputs from a sensing device 30 or on information from a network outside the vehicle. The arithmetic unit 100 is a microprocessor comprised of one or more chips, and includes a CPU, a memory, and the like. Note that FIG. 1 mainly shows a configuration to exert the route generating function of the present embodiment, and does not necessarily show all the functions the arithmetic unit 100 has.

The sensing device 30 that outputs information to the arithmetic unit 100 includes, for example: (1) a plurality of cameras 20 that are provided to the body or the like of the vehicle 10 and that take images of the vehicle's external environment (including an object outside the vehicle 10); (2) a plurality of radars 32 that are provided to the body or the like of the vehicle 10 and that detect a target or the like outside the vehicle 10; (3) a position sensor 33 that detects the position of the vehicle 10 (vehicle position information) by using a Global Positioning System (GPS); (4) a vehicle status sensor 34 that acquires a status of the vehicle 10 and that includes sensors detecting the behavior of the vehicle 10, such as a vehicle speed sensor, an acceleration sensor, and a yaw rate sensor; (5) an occupant status sensor 35 that is comprised of an in-vehicle camera or the like and that acquires a status of an occupant on the vehicle 10; and (6) a driving operation information acquisition unit 36 for detecting the driving operation of the driver. In addition, the arithmetic unit 100 receives communication information from another vehicle (other vehicles) around the subject vehicle 10 or traffic information from a navigation system through an external communication unit 41 connected to a network outside the vehicle.

Figure 3:
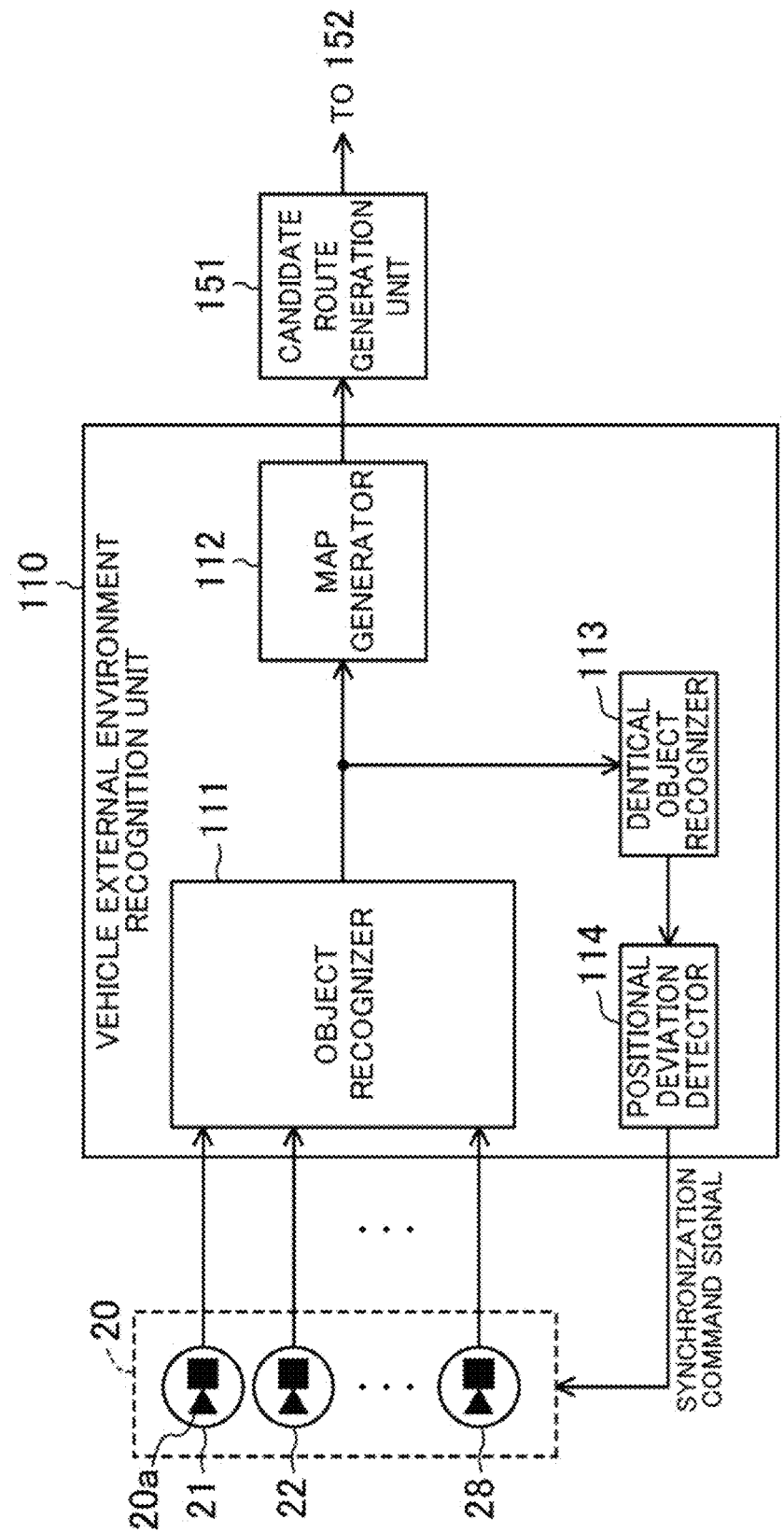
FIG. 3 is a block diagram showing a configuration of the external environment recognition device.
Figure 4:
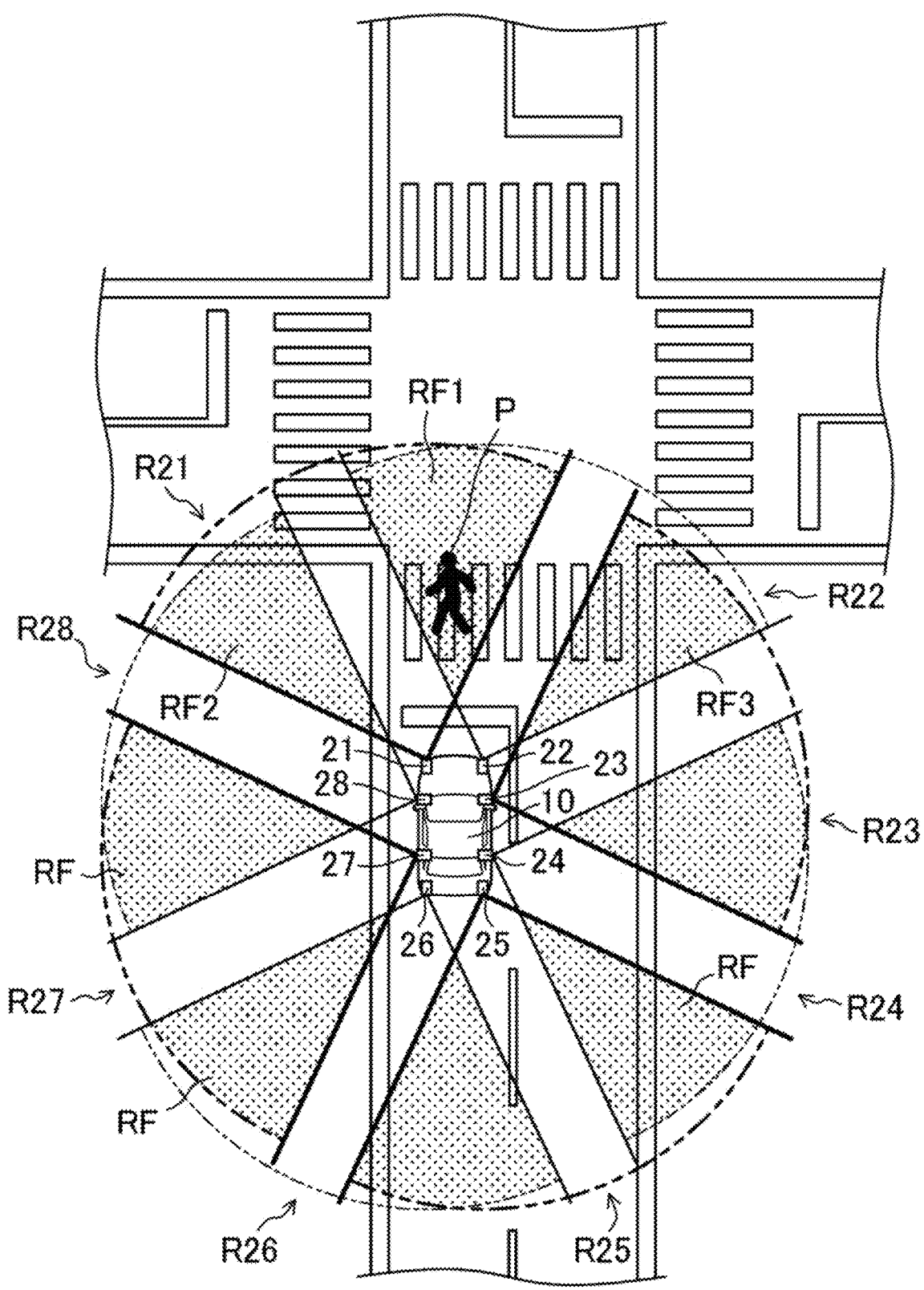
FIG. 4 illustrates an example of the arrangement of cameras and an example of an imaging area of the external environment recognition device.

The cameras 20 are arranged to image the surroundings of the vehicle 10 at 360° in the horizontal direction. Specifically, as illustrated in FIG. 3, each of the cameras 20 includes an imaging unit 20a (corresponding to an information detection unit) that captures optical images showing the vehicle's external environment, using an imaging device, such as charged-coupled devices (CCDs) and complementary metal oxide semiconductors (CMOSs), to generate image data. As illustrated in FIG. 4, the cameras 20 are arranged such that the imaging area captured by the imaging unit 20a of each camera 20 includes an overlapping region RF where part of the imaging area captured by the camera 20 overlaps with part of the imaging area captured by an adjacent camera 20. FIG. 4 illustrates an example in which eight cameras 20 are installed in the vehicle 10. For convenience of explanation in the following description, the cameras are denoted by 21, 22, . . . , and 28 clockwise from the camera 20 installed on the left side of the front of the vehicle 10. In FIG. 4, the imaging areas of the cameras 21, 22, . . . , and 28 are schematically illustrated and denoted by R21, R22, . . . , and R28, respectively. Further, in FIG. 4, the overlapping regions are dotted and denoted by RF. The overlapping region RF by the cameras 21 and 22 capturing images ahead of the vehicle 10 is denoted by RF1. Similarly, the overlapping region RF by the cameras 21 and 28 is denoted by RF2, and the overlapping region RF by the cameras 22 and 23 is denoted by RF3.

Each camera 20 outputs the imaging data captured by the imaging unit 20a to the arithmetic unit 100. The imaging data captured by each camera 20 is input not only to the arithmetic unit 100, but also to a human machine interface (HMI) unit 61. The HMI unit 61 displays information based on the image data acquired, on a display device or the like in the vehicle. Each camera 20 corresponds to an imaging device for capturing images of objects outside the vehicle 10.

Similarly to the cameras 20, the radars 32 are arranged so that the detection range covers 360° of the vehicle 10 in the horizontal direction. The type of the radars 32 is not particularly limited. For example, a millimeter wave radar may be adopted. Although not specifically shown in the drawings, each of the radars 32 may be an imaging radar or a laser radar capable of capturing images. Similarly to the cameras 20, the radars 32 may output imaging data to the arithmetic unit 100. In such a case, each radar 32 corresponds to an imaging device for capturing images of the external environment of the vehicle 10.

Figure 2:
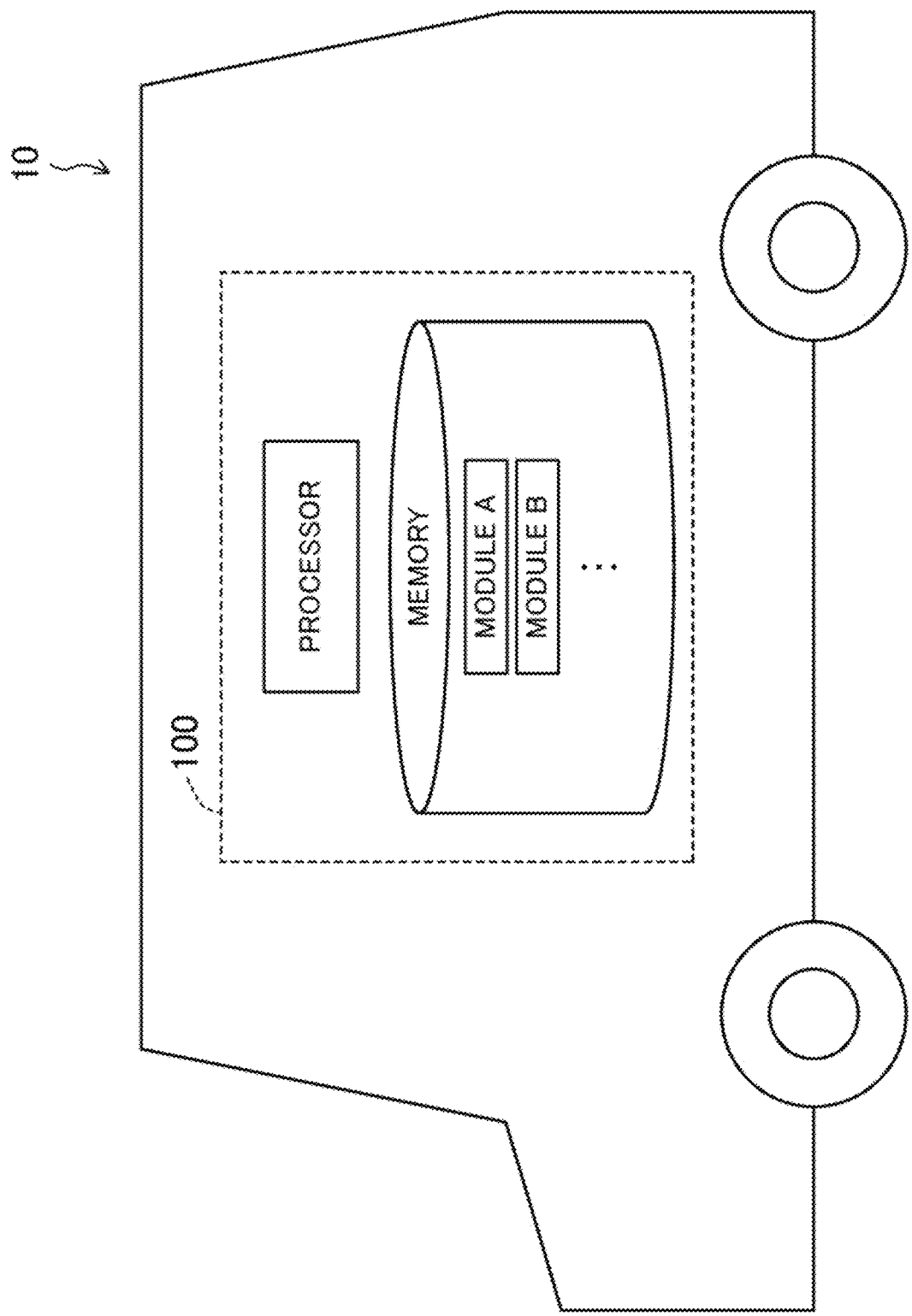
FIG. 2 schematically shows a vehicle having an information display device for vehicle on board.

The arithmetic unit 100 determines a target motion of the vehicle 10 based on outputs from the sensing device 30, such as the cameras 20 and the radars 32, and on information received from a network outside the vehicle via the external communication unit 41, calculates a driving force, a braking force, and a steering amount for achieving the determined target motion, and outputs a calculation result to a control unit 50 that controls an engine, a brake, or the like. In the example configuration illustrated in FIG. 2, the arithmetic unit 100 includes a processor and a memory. The memory stores modules each of which is a software program executable by the processor. The function of each unit of the arithmetic unit 100 shown in FIG. 1 is achieved, for example, by the processor executing the modules stored in the memory. In addition, the memory stores data of a model used by the arithmetic unit 100. Note that a plurality of processors and a plurality of memories may be provided. Part of the function of each unit of the arithmetic unit 100 shown in FIG. 1 may be achieved by a hardware circuit.

As shown in FIG. 1, to set the target motion of the vehicle 10, the arithmetic unit 100 includes: a vehicle external environment recognition unit 110 that recognizes a vehicle's external environment based on the outputs from the sensing device 30, such as cameras 20, or the information input from the external communication unit 41; a candidate route generation unit 151 that calculates one or more candidate routes that can be traveled by the vehicle 10, in accordance with the vehicle's external environment recognized by the vehicle external environment recognition unit 110; a vehicle behavior estimation unit 152 that estimates the behavior of the vehicle 10 based on an output from the vehicle status sensor 34; an occupant behavior estimation unit 153 that estimates the behavior of an occupant on the vehicle 10 based on an output from the occupant status sensor 35; a route decision unit 154 that decides a route to be traveled by the vehicle 10; and a vehicle motion decision unit 155 that decides the target motion of the vehicle 10 so that the vehicle 10 follows the route set by the route decision unit 154.

<Vehicle External Environment Recognition Unit>

As illustrated in FIG. 3, the vehicle external environment recognition unit 110 recognizes the vehicle's external environment based on an output from each camera 20. The vehicle external environment recognition unit 110 includes an object recognizer 111, a map generator 112, an identical object recognizer 113, and a positional deviation detector 114.

The object recognizer 111 recognizes what an object outside the vehicle is, based on the imaging data received from the cameras 20 or the peak list of reflected waves received from the radars 32, for example. For example, the object recognizer 111 detects an object outside the vehicle based on the imaging data or the peak list, identifies the object outside the vehicle, using identification information or the like in a database or the like stored in the arithmetic unit 100, and recognizes the object as "information of object outside vehicle." The object recognizer 111 receives outputs from the radars 32 and may acquire "positioning information of target" including, e.g., the position and speed of the target present around the vehicle 1, as the "information of object outside vehicle." The object recognizer 111 classifies objects outside the vehicle based on "information of object outside vehicle" and "positioning information of target" and recognizes the location information of each object. The classification herein may be to classify the objects broadly according to whether the object is a "static object" or an "object that can move" or may be to classify the objects based on specific target objects, such as "persons", "signs", and "crosswalks." The object recognizer 111 may identify or classify the objects outside the vehicle by a neural network or the like. Alternatively, the object recognizer 111 may obtain the position and speed of the vehicle 10 from the output information from the sensors comprising the sensing device 30.

The map generator 112 compares three-dimensional information of the surroundings of the vehicle 10 with a vehicle external environment model, based on the information of object outside the vehicle which has been recognized in the object recognizer 111, thereby recognizing the vehicle's external environment, including the road and obstacles, to create a map. The vehicle external environment model is, for example, a learned model generated by deep learning, and allows recognition of a road, an obstacle, and the like with respect to the three-dimensional information of the surroundings of the vehicle. The map generator 112 may generate three- or two-dimensional map of the surroundings, or both of such maps.

Specifically, for example, the map generator 112 identifies a free space, that is, an area without an object, based on the information of object outside the vehicle which has been recognized in the object recognizer 111. In this processing, for example, a learned model generated by deep learning is used. The map generator 112 generates a two-dimensional map that represents the free space. The map generator 112 also generates a three-dimensional map that represents the surroundings of the vehicle 10, using the positioning information of target. In this process, information of the installation positions and shooting directions of the cameras 20, and information of the installation positions and the transmission direction of the radars 32 are used. The map generator 112 compares the generated three-dimensional map with the vehicle external environment model to recognize the vehicle's external environment including roads and obstacles and outputs the results of the recognition to the candidate route generation unit 151. In the deep learning, a multilayer neural network, e.g., a deep neural network (DNN) is used. An example of the multilayer neural network is convolutional neural network (CNN). The candidate route generation unit 151 generates candidate routes that can be traveled by the vehicle 10, based on the outputs from the vehicle external environment recognition unit 110, the outputs from the position sensor 33, the information transmitted from an external network via the external communication unit 41, for example.

The identical object recognizer 113 compares the results of image capturing of adjacent ones of the cameras 21, 22, . . . , and 28, based on the information of object outside the vehicle recognized in the object recognizer 111 and extracts objects identical with each other (hereinafter simply referred to as the "identical objects") in the overlapping region RF.

Specifically, for example, FIG. 4 illustrates an example in which the vehicle 10 stops before entering an intersection and in which a person P walks on a crosswalk ahead of the vehicle 10 in a direction that intersects with the moving direction of the vehicle 10. The identical object recognizer 113 extracts, as the identical objects, objects included in the image data acquired by the cameras 21 and 22, both of which are installed on the front side of the vehicle 10, in the overlapping region RF1 ahead of the vehicle 10. For example, in the examples of FIG. 4 and FIGS. 6A and 6B, which will be described later, the person P, a crosswalk 71, and a curb 72, for example, are extracted as the identical objects. That is, the extraction processing by the identical object recognizer 113 is performed by comparing the results of capturing by both of the cameras 21 and 22 capturing the overlapping region RF. The identical objects are not limited to the above items and may be different objects such as other vehicles and signs.

The positional deviation detector 114 determines whether or not the positions of the identical objects in the overlapping region deviate from each other. If there is a positional deviation, the positional deviation detector 114 outputs a synchronization command signal for synchronizing the plurality of cameras 20. For example, in the example of FIG. 4, the object extracted from the image obtained by capturing the overlapping region RF by the camera 21 and the object extracted from the image obtained by capturing the overlapping region RF by the camera 22 are compared with each other to extract identical objects and determine whether or not there is a deviation in position between the identical objects in the overlapping region RE. The method of determining the presence or absence of a positional deviation is not particularly limited. For example, a method may be employed in which among the identical objects, objects which have been recognized as static objects by the object recognizer 111 may be superimposed on each other to check whether or not there is a positional deviation between other identical objects. In the present embodiment, an example is shown in which the object recognizer 111, the identical object recognizer 113, and the positional deviation detector 114 implement a function corresponding to a synchronous processing unit.

(Operation of External Environment Recognition Device)

Next, the operation of the external environment recognition device will be described with reference to FIGS. 5 to 7.

In FIG. 5, Step S11 to Step S13 indicate a process from capturing of images by the cameras 20 to the extraction of identical objects by the object recognizer 111.

First in Step S11, as illustrated in FIG. 7, the positional deviation detector 114 transmits a synchronous processing signal to the cameras 21, 22, . . . , and 28 to perform synchronous processing. After the synchronous processing, the cameras 21, 22, . . . , and 28 start capturing images. Each of the cameras 21, 22, . . . , and 28 transmits the result of image capturing to the object recognizer 111 based on the clock signal of its own. The object recognizer 111 converts the imaging data transmitted from each of the cameras 21, 22, . . . , and 28 to an image data and detects an object included in the image data. In FIG. 7, to facilitate understanding of the description, the number after the character "P" represents the identification number of a camera, and the number after the hyphen represents the timing of image: the same number represents the same timing. For example, in FIG. 7, P1-1 indicates the first image captured by the camera 21; P1-2 indicates the second image captured by the camera 21; and P2-1 indicates the first image captured by the camera 22. The characters w, x, y, and z are in a relationship of $z=y+1=x+2=w+3$.

In Step S12, the object recognizer 111 classifies objects and estimates the position of each object. A method of estimating the position of each object is not particularly limited. For example, the position of each object may be estimated by a method of reconstructing a three-dimensional space from the imaging data. Alternatively, for example, the position of each object may be estimated based on the position where each of the cameras 21, 22, . . . , and 28 is installed, or a reference object may be chosen to estimate the position of each object based on a positional relationship with the reference object.

Figure 6A:
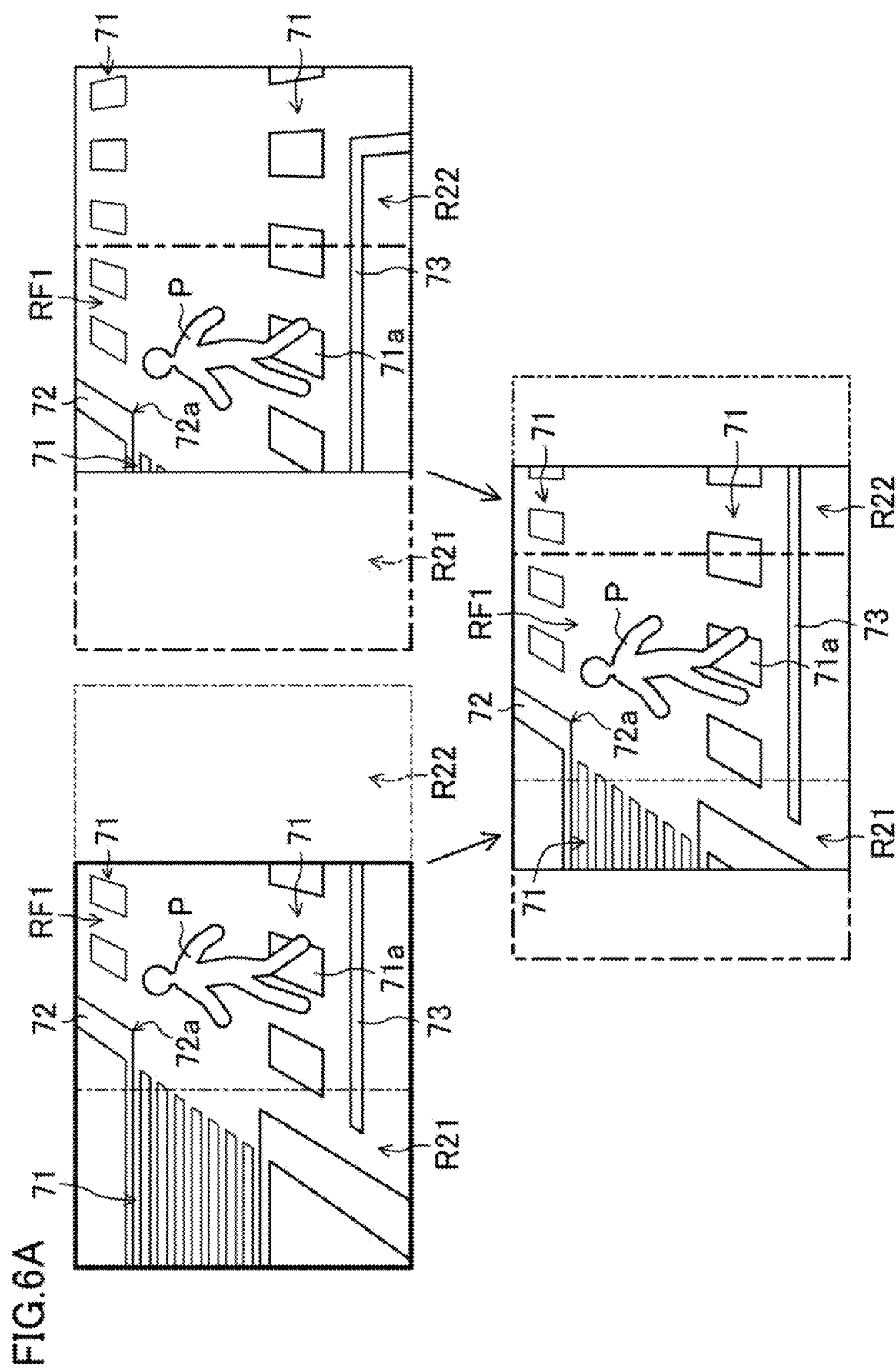
FIG. 6A illustrates operations of the external environment recognition device.

In Step S13, the identical object recognizer 113 extracts identical objects in the overlapping region RF. For example, in each of FIGS. 6A and 6B, the upper left illustration shows the result of image capturing by the camera 21, and the upper right illustration shows the result of image capturing by the camera 22. A region in each result of image capturing surrounded by the virtual line is the overlapping region RF1. In the examples of FIGS. 6A and 6B, the identical object recognizer 113 recognizes the crosswalk 71, the person P walking on the crosswalk 71, the L-shaped curb 72 visible at the back of the image, and the stop line 73 as identical objects in both of the upper right image data and the upper left image data in each of FIGS. 6A and 6B. At the recognition, the identical object recognizer 113 may identify, from among the identical objects, the crosswalk 71, the curb 72, and the stop line 73 as static objects and the person P as a moving object with reference to images preceding and succeeding in time, a template stored in advance, or the like.

In the subsequent Step S14, the positional deviation detector 114 detects a positional deviation between the image in the overlapping region RF captured by the camera 21 and the image in the overlapping region RF captured by the camera 22. FIG. 6A illustrates example images in the case where there is no positional deviation. FIG. 6B illustrates example images in the case where there is a positional deviation. For example, the positional deviation detector 114 identifies the near side corners 72a of the curbs 72, which are identical objects and are also static objects, from the respective images captured by the cameras 21 and 22, and superimposes the corners 72a on each other to align the images and see whether or not the other objects, except the corners 72a, are superimposed, thereby detecting the positional deviation of the images. The detection is performed in this manner, and in the case of FIG. 6A, for example, the positional deviation detector 114 detects that there is no positional deviation in all the identical objects.

Turning back to FIG. 5, if the positional deviation is not detected in Step S14, the answer will be NO in the subsequent Step S15, and the process returns to the aforementioned Step S11.

On the other hand, in the case of FIG. 6B, the positional deviation detector 114 detects that blur has occurred in the image of the person P and that there is a positional deviation. If the positional deviation detector 114 detects a positional deviation, the positional deviation detector 114 sets a flag indicating the occurrence of the positional deviation, as illustrated in FIG. 7, for example. In the example of FIG. 7, although the image P1-w of the camera 21 and the image P8-w of the camera 28 are the images captured at the same timing, a positional deviation occurs, and hence a flag indicating the detection of the positional deviation is set, because the image P2-x of the camera 22 is an image captured at different timing from the timing at which the images of the cameras 21 and 28 are captured.

Turning back to FIG. 5, if the positional deviation is detected in Step S14, the answer will be YES in the subsequent Step S15, and the positional deviation detector 114 checks whether or not the synchronous processing of the camera 20 has been executed (Step 16). That is, the positional deviation detector 114 checks whether or not the synchronous processing in Step S17, which will be described later, has been executed.

In Step S16, if the synchronous processing of the camera 20 has not been executed (NO in Step S16), the positional deviation detector 114 performs synchronous processing to synchronize the camera 20 where the positional deviation occurs (Step S17). For example, the positional deviation detector 114 transmits a synchronous processing signal to the camera 20 to be synchronized, so that the camera 20 is synchronized. As illustrated in FIG. 7, the synchronous processing may be performed on all the cameras, or may be performed on the cameras 20 (cameras 21 and 22 in the example of the 6B) that capture the overlapping region RF in which the positional deviation is detected. Various known methods can be employed as the method of performing synchronizing processing on the camera 20. Thus, detailed description thereof will be omitted herein. When the synchronous processing in Step S17 ends, the process returns to Step S11.

On the other hand, if the synchronous processing of the camera 20 has already been executed in Step S16 (YES in Step S16), the arithmetic unit 100 provides notification that the positional deviation is not eliminated by the synchronous processing (Step S18). If the positional deviation is not eliminated by the synchronous processing on the camera 20, it may be because the camera 20 is physically displaced due to impact from the outside and is thus in a state in which "the installation position of the camera 20 itself is shifted." Thus, the notification from the arithmetic unit 100 can urge the driver or other passengers to check the circumstances. The notification method in Step S18 is not particularly limited. Although not illustrated, the notification may be a warning sound from a speaker, a beeper, or any other equipment, or a warning lamp, or may be given via a display screen of a car navigation system or the like, for example. The speaker, the beeper, the warning lamp, and the car navigation system are examples of the abnormality notification device.

Turning back to FIG. 1, the blocks subsequent to the block of the candidate route generation unit 151 will be briefly described below.

The vehicle behavior estimation unit 152 estimates a status of the vehicle from the outputs of the sensors which detect the behavior of the vehicle, such as a vehicle speed sensor, an acceleration sensor, and a yaw rate sensor. The vehicle behavior estimation unit 152 generates a six-degrees-of-freedom (6DoF) model of the vehicle indicating the behavior of the vehicle.

The occupant behavior estimation unit 153 particularly estimates the driver's health condition and emotion from the results of the detection of the occupant status sensor 35. The health conditions include, for example, good health condition, slightly fatigue, poor health condition, decreased consciousness, and the like. The emotions include, for example, fun, normal, bored, annoyed, uncomfortable, and the like.

The route decision unit 154 decides the route to be traveled by the vehicle 10 based on the outputs from the occupant behavior estimation unit 153. If the number of routes generated by the candidate route generation unit 151 is one, the route decision unit 154 decides this route to be the route to be traveled by the vehicle 10. If the candidate route generation unit 151 generates a plurality of routes, a route that an occupant (in particular, the driver) feels most comfortable with, that is, a route that the driver does not perceive as a redundant route, such as a route too cautiously avoiding an obstacle, is selected out of the plurality of candidate routes, in consideration of an output from the occupant behavior estimation unit 153.

The vehicle motion decision unit 155 decides a target motion for the travel route decided by the route decision unit 154. The target motion means steering and acceleration/deceleration for following the travel route. In addition, with reference to the 6DoF model of the vehicle, the vehicle motion decision unit 155 calculates the motion of the vehicle body for the travel route selected by the route decision unit 154.

A physical amount calculation unit calculates a driving force, a braking force, and a steering amount for achieving the target motion, and includes a driving force calculation unit 161, a braking force calculation unit 162, and a steering amount calculation unit 163. To achieve the target motion, the driving force calculation unit 161 calculates a target driving force to be generated by powertrain devices (the engine and the transmission). To achieve the target motion, the braking force calculation unit 162 calculates a target braking force to be generated by a brake device. To achieve the target motion, the steering amount calculation unit 163 calculates a target steering amount to be generated by a steering device.

A peripheral device operation setting unit 170 sets operations of body-related devices of the vehicle 10, such as lamps and doors, based on outputs from the vehicle motion decision unit 155. The devices include, for example, actuators and sensors to be controlled while the motor vehicle is traveling or while the motor vehicle is being stopped or parked.

<Output Destination of Arithmetic Unit>

An arithmetic result of the arithmetic unit 100 is output to a control unit 50 and a body-related microcomputer 60. The control unit 50 includes a powertrain microcomputer 51, a brake microcomputer 52, and a steering microcomputer 53. Specifically, information related to the target driving force calculated by the driving force calculation unit 161 is input to the powertrain microcomputer 51. Information related to the target braking force calculated by the braking force calculation unit 162 is input to the brake microcomputer 52. Information related to the target steering amount calculated by the steering amount calculation unit 163 is input to the steering microcomputer 53. Information related to the operations of the body-related devices set by the peripheral device operation setting unit 170 is input to the body-related microcomputer 60. The steering microcomputer 53 includes a microcomputer for electric power assisted steering (EPAS).

In summary, the external environment recognition device of the present embodiment includes: a plurality of cameras 20 each having an imaging unit 20a that captures an external environment of a vehicle and arranged such that an imaging area captured by the imaging unit 20a includes an overlapping region RF where at least part of the imaging area captured by the imaging unit 20a overlaps with at least part of an imaging area captured by another imaging unit 20a; and a synchronous processing unit that extracts identical objects (e.g., a person P) in the overlapping region RF from results of image capturing by the cameras 20, and performs synchronous processing to synchronize the plurality of cameras 20 if there is a deviation in position between the identical objects in the overlapping region RF.

The external environment recognition device of the present embodiment performs synchronous processing to synchronize the plurality of cameras 20 if there is a deviation in position between the identical objects in the overlapping region RF. This configuration allows the cameras 20 to be synchronized when the positional deviation occurs. It is also possible not to execute synchronous processing if there is no positional deviation in the results of image capturing by the cameras 20, that is, while the cameras 20 are maintained in the synchronized state with each other. Thus, the processing resources for the synchronous processing can be saved, compared with the case like Patent Document 1 in which the synchronous processing is performed periodically. Further, since the synchronous processing is performed on the cameras 20, it is possible to obtain output signals after the synchronous processing from the cameras 20. This means that it is possible to synchronize signals at stages before execution of various types of image processing or any other processing for recognizing the external environment of the vehicle. The load on processing, such as image processing, can thus be reduced.

OTHER EMBODIMENTS

In the above embodiment, an example in which cameras 20 are used as an external environment recognition sensor has been described. However, the external environment recognition sensor is not limited to the cameras 20, and may be a different sensing device 30. For example, radars 32 may be used as the external environment recognition sensor in addition to or instead of the cameras 20.

In the above embodiment, an example has been described in which the static objects (e.g., the curb 72) are extracted from the overlapping region RF and the static objects (e.g., the corner 72a of the curb 72) are superimposed on each other to detect a deviation in position between identical objects (e.g., a person P). However, the method of determining whether or not there is a deviation in position between the identical objects is not limited thereto. For example, since the cameras 20 are installed at fixed positions, the positional relationship between the regions overlapping each other may be such that the overlapping regions are directly superimposed on each other based on the installation positions of the cameras 20, or may be determined based on the physical distance between objects. However, images are more accurately aligned by identifying static objects and superimposing the static objects on each other.

In the above embodiment, an example has been described in which the external environment recognition device performs the synchronous processing while the vehicle 10 stops at the intersection. However, a similar process as in FIG. 5 (detection of a positional deviation and synchronous processing) may be performed while the vehicle 10 is traveling.

The camera 20 that causes a positional deviation may be identified using the images of a plurality of overlapping regions. Specifically, the positional deviation detection processing similar to that in the above embodiment may be performed on the overlapping region RF2 of the cameras 21 and 28 and the overlapping region RF3 of the cameras 22 and 23, in addition to the overlapping region RF1 of the cameras 21 and 22. In a case in which a positional deviation such as the one in FIG. 6B occurs in the overlapping region RF1, and a similar positional deviation occurs in the overlapping region RF2, as well, it can be determined that the camera 20 causes the positional deviation. Identifying the camera that causes the positional deviation in this manner makes it possible to perform the synchronous processing on that camera alone, or give notification to the user or the like.

INDUSTRIAL APPLICABILITY

The technology disclosed herein is useful as an external environment recognition device that recognizes an external environment of an autonomous mobile object.

The invention claimed is:

1. An external environment recognition device that recognizes an external environment of an autonomous mobile object, the external environment recognition device comprising:
a plurality of external environment recognition sensors each having an information detection circuit that detects information of an object outside the autonomous mobile object, the plurality of external environment recognition sensors being arranged such that a detection range of the information detection circuit includes an overlapping region where at least part of the detection range of the information detection circuit overlaps with at least part of the detection range of another one of the information detection circuits; and
a synchronous processing circuit that extracts identical objects in the overlapping region from detection results of the external environment recognition sensors, performs no synchronous processing if there is no deviation in position between the identical objects in the overlapping region, and performs synchronous processing to synchronize the plurality of external environment recognition sensors a timing when a deviation in position between the identical objects in the overlapping region occurs, wherein
the plurality of external environment recognition sensors include a plurality of cameras arranged so as to have the overlapping region, and
the synchronous processing circuit extracts identical objects from images in the overlapping region of the plurality of cameras, identifies static objects from among the identical objects, and superimposes the static objects on each other to determine whether or not there is a deviation in position between the identical objects.

2. The external environment recognition device of claim 1, wherein
the synchronous processing circuit determines whether or not there is a deviation in position between the identical objects based on extraction results of the identical objects in the overlapping region detected when a moving speed of the autonomous mobile object is lower than a predetermined threshold value.

3. The external environment recognition device of claim 1, further comprising:
an abnormality notification circuit that provides notification of abnormality of any one of the external environment recognition sensors if the positional deviation between the identical objects is not eliminated after the synchronous processing circuit executes the synchronous processing.

4. An external environment recognition method that recognizes an external environment of an autonomous mobile object, the method comprising:
receiving detection results from a plurality of external environment recognition sensors each having an information detection circuit that detects information of an object outside the autonomous mobile object, the plurality of external environment recognition sensors being arranged such that a detection range of the information detection circuit includes an overlapping region where at least part of the detection range of the information detection circuit overlaps with at least part of the detection range of another one of the information detection circuits;

extracting identical objects in the overlapping region from the detection results of the external environment recognition sensors;

performing no synchronous processing if there is no deviation in position between the identical objects in the overlapping region; and performing synchronous processing to synchronize the plurality of external environment recognition sensors a timing when a deviation in position between the identical objects in the overlapping region occurs, wherein the plurality of external environment recognition sensors include a plurality of cameras arranged so as to have the overlapping region, and further comprising:

extracting identical objects from images in the overlapping region of the plurality of cameras, identifies static objects from among the identical objects; and superimposing the static objects on each other to determine whether or not there is a deviation in position between the identical objects.

5. The method of claim 4, further comprising:
determining whether or not there is a deviation in position between the identical objects based on extraction results of the identical objects in the overlapping region detected when a moving speed of the autonomous mobile object is lower than a predetermined threshold value.

6. The method of claim 4, further comprising:
providing notification of abnormality of any one of the external environment recognition sensors if the positional deviation between the identical objects is not eliminated after the synchronous processing.

7. A non-transitory computer readable storage device having computer readable instructions that when executed by circuitry cause the circuitry to:

receive detection results from a plurality of external environment recognition sensors each having an information detection circuit that detects information of an object outside an autonomous mobile object, the plurality of external environment recognition sensors being arranged such that a detection range of the information detection circuit includes an overlapping region where at least part of the detection range of the information detection circuit overlaps with at least part of the detection range of another one of the information detection circuits;

extract identical objects in the overlapping region from the detection results of the external environment recognition sensors;

perform no synchronous processing if there is no deviation in position between the identical objects in the overlapping region; and perform synchronous processing to synchronize the plurality of external environment recognition sensors a timing when a deviation in position between the identical objects in the overlapping region occurs, wherein the plurality of external environment recognition sensors include a plurality of cameras arranged so as to have the overlapping region, and the circuitry is further caused to:

extract identical objects from images in the overlapping region of the plurality of cameras, identifies static objects from among the identical objects; and superimpose the static objects on each other to determine whether or not there is a deviation in position between the identical objects.

8. The non-transitory computer readable storage device of claim 7, wherein the circuitry is further caused to:
determine whether or not there is a deviation in position between the identical objects based on extraction results of the identical objects in the overlapping region detected when a moving speed of the autonomous mobile object is lower than a predetermined threshold value.

9. The non-transitory computer readable storage device of claim 7, wherein the circuitry is further caused to:
provide notification of abnormality of any one of the external environment recognition sensors if the positional deviation between the identical objects is not eliminated after the synchronous processing.

\* \* \* \* \*